US010455031B2

(12) United States Patent
Frederick

(10) Patent No.: US 10,455,031 B2
(45) Date of Patent: Oct. 22, 2019

(54) SYSTEMS AND METHODS TO DETERMINE LOCATION RECOMMENDATIONS

(71) Applicant: Facebook, Inc., Menlo Park, CA (US)

(72) Inventor: Adriel Samuel Frederick, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 149 days.

(21) Appl. No.: 14/971,847

(22) Filed: Dec. 16, 2015

(65) Prior Publication Data

US 2017/0180493 A1     Jun. 22, 2017

(51) Int. Cl.
*H04L 29/08* (2006.01)
*G06Q 50/00* (2012.01)
*H04W 4/21* (2018.01)

(52) U.S. Cl.
CPC ............ *H04L 67/22* (2013.01); *G06Q 50/01* (2013.01); *H04L 67/306* (2013.01); *H04W 4/21* (2018.02)

(58) Field of Classification Search
CPC . H04L 63/08; H04L 2463/082; H04L 63/105; H04L 51/32; H04L 4/02; G06F 17/3053; G06F 17/30241; G06F 17/3087; G06F 21/31; G06Q 50/01; G06Q 40/02; H04W 4/02
See application file for complete search history.

(56) References Cited

U.S. PATENT DOCUMENTS

| | | | | |
|---|---|---|---|---|
| 9,078,766 B2* | 7/2015 | Dadu | | G06F 1/3209 |
| 9,288,269 B2* | 3/2016 | Ispas | | H04L 67/125 |
| 9,491,603 B2* | 11/2016 | Papakipos | | G06Q 10/10 |
| 9,584,955 B2* | 2/2017 | Park | | H04W 4/008 |
| 9,710,546 B2* | 7/2017 | Paruchuri | | G06F 17/30684 |
| 2007/0078807 A1* | 4/2007 | Bond | | G06F 17/30241 |
| 2007/0083887 A1* | 4/2007 | Gutta | | G06Q 30/02 725/35 |
| 2008/0091518 A1* | 4/2008 | Eisenson | | G06Q 30/0267 705/14.64 |
| 2008/0301582 A1* | 12/2008 | Gluck | | G06F 17/30867 715/811 |
| 2010/0250131 A1* | 9/2010 | Relyea | | G01C 21/20 701/469 |
| 2011/0179019 A1* | 7/2011 | Amer-Yahia | | G06F 17/30867 707/723 |
| 2013/0024431 A1* | 1/2013 | Parthasarathy | ... | G06F 17/30663 707/692 |
| 2013/0237254 A1* | 9/2013 | Papakipos | | G06Q 10/10 455/456.3 |
| 2015/0154607 A1* | 6/2015 | Frome | | G06Q 30/018 705/317 |
| 2015/0223013 A1* | 8/2015 | Park | | H04W 4/008 455/41.2 |
| 2015/0278348 A1* | 10/2015 | Paruchuri | | G06F 17/30684 707/771 |
| 2016/0012513 A1* | 1/2016 | Martinez | | G06Q 30/0631 705/15 |
| 2017/0019856 A1* | 1/2017 | Papakipos | | G06Q 10/10 |

* cited by examiner

*Primary Examiner* — Ninos Donabed
(74) *Attorney, Agent, or Firm* — Sheppard Mullin Richter & Hampton LLP

(57) ABSTRACT

Systems, methods, and non-transitory computer readable media are configured to receive ratings for a plurality of locations associated with a location type. The ratings are processed to develop a personalized model for a user to identify candidate locations for the user. At least one candidate location is provided as a recommendation for the user based on the personalized model.

18 Claims, 9 Drawing Sheets

550 

```
Calculate a pairwise difference between a rating for at least a first location from
a user and each rating for at least the first location from each user in a set of
other users to generate difference values
552
```

```
Combine the difference values to generate a confidence interval
554
```

```
Calculate an expected rating for a second location for the user based on ratings
for the second location from the set of other users
556
```

```
Apply the confidence interval to the expected rating to generate an expected
rating interval
558
```

```
Receive an actual rating for the second location from the user
560
```

FIGURE 5B

550 

```
┌─────────────────────────────────────────────────────────────────────┐
│ Determine that the actual rating does not fall within the expected rating interval │
│                                 562                                 │
└─────────────────────────────────────────────────────────────────────┘
                                    │
                                    ▼
┌─────────────────────────────────────────────────────────────────────┐
│  Develop the personalized model based on additional ratings for additional  │
│          locations from the user and the set of other users          │
│                                 564                                 │
└─────────────────────────────────────────────────────────────────────┘
```

FIGURE 5C

SYSTEMS AND METHODS TO DETERMINE LOCATION RECOMMENDATIONS

FIELD OF THE INVENTION

The present technology relates to the field of content provision. More particularly, the present technology relates to techniques for determining recommended locations for users in a social networking system.

BACKGROUND

Today, people often utilize computing devices for a wide variety of purposes. Users can use their computing devices, for example, to communicate and otherwise interact with other users. Such interactions are increasingly popular over a social networking system.

Interactions in a social networking system may include the sharing of content. Content shared on the social networking system can include information that is relevant to interests or activities of the user on the social networking system or apart from the social networking system. One example of such content is recommendations. Recommendations can suggest any type of information to a user, such as a suggested location constituting a restaurant, a business, a museum, or any other type of establishment or location. Recommendations can provide the user helpful information in an expeditious manner that can minimize effort the user would otherwise need to expend to discover the same information. Further, recommendations that leverage the collective experience of a community of the social networking system can be potentially even more authoritative and effective.

SUMMARY

Various embodiments of the present technology can include systems, methods, and non-transitory computer readable media configured to receive ratings for a plurality of locations associated with a location type. The ratings are processed to develop a personalized model for a user to identify candidate locations for the user. At least one candidate location is provided as a recommendation for the user based on the personalized model.

In an embodiment, the location type relates to at least one of restaurants, stores, schools, bars, companies, congregations, and destinations.

In an embodiment, for each respective location of the plurality of locations, attribute values of each attribute associated with the location type are determined.

In an embodiment, at least a portion of the attribute values are determined based at least in part on user data maintained by a social networking system.

In an embodiment, the processing of the ratings further comprises: correlating the ratings for the plurality of locations with the attribute values for each respective location of the plurality of locations; identifying attribute values that are desired by the user based on the correlating; and developing the personalized model to reflect the attribute values that are desired by the user.

In an embodiment, the processing of the ratings further comprises: assigning a weight to each attribute value to reflect an importance of the attribute value to the user; and developing the personalized model to reflect the assigned weight.

In an embodiment, the receiving of the ratings further comprises: receiving a rating for at least a first location from the user; receiving ratings for at least the first location from a set of other users; and receiving ratings for a second location from the set of other users.

In an embodiment, the processing of the ratings further comprises: calculating a pairwise difference between the rating for at least the first location from the user and each rating for at least the first location from each user in the set of other users to generate difference values; and combining the difference values to generate a confidence interval.

In an embodiment, the processing of the ratings further comprises: calculating an expected rating for the second location for the user based on the ratings for the second location from the set of other users; and applying the confidence interval to the expected rating to generate an expected rating interval.

In an embodiment, the processing of the ratings further comprises: receiving an actual rating for the second location from the user; determining that the actual rating does not fall within the expected rating interval; and developing the personalized model based on additional ratings for additional locations from the user and the set of other users.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIGS. 5B-5C illustrate a third method to recommend a location, according to an embodiment of the present technology.

Figure 1:
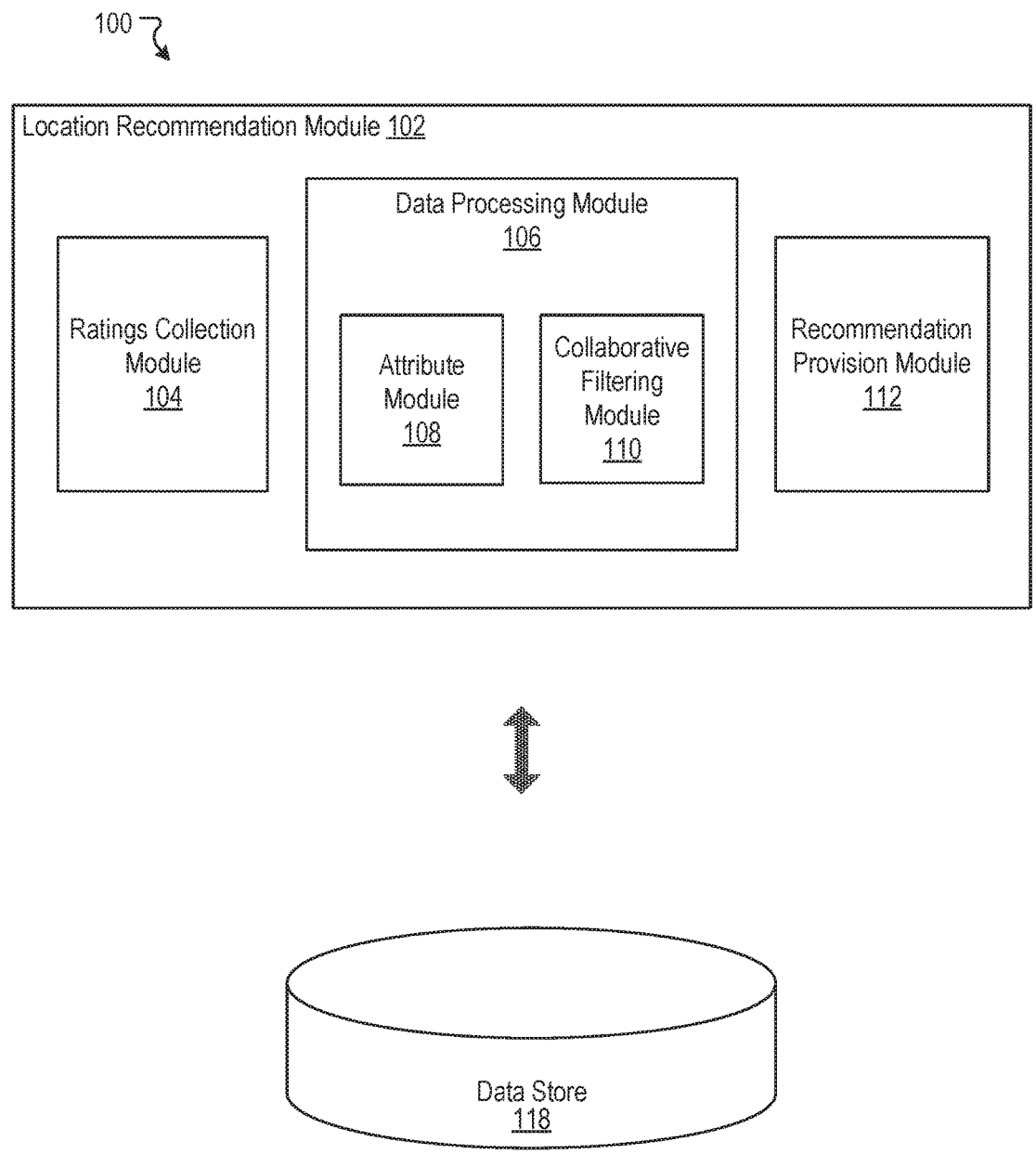
FIG. 1 illustrates a system including an example location recommendation module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Recommending Locations for a User

As mentioned, Interactions in a social networking system may include the sharing of content. Content shared on the social networking system can include information that is relevant to interests or activities of the user on the social networking system or apart from the social networking system. One example of such content is recommendations. Recommendations can suggest any type of information to a user, such as a suggested location constituting a restaurant, a business, a museum, or any other type of establishment or location. Recommendations can provide the user helpful information in an expeditious manner that can minimize effort the user would otherwise need to expend to discover the same information. Further, recommendations that leverage the collective experience of a community of the social networking system or the social networking system as a whole can be potentially even more authoritative or effective.

However, conventional techniques rooted in computer technology often can provide inaccurate recommendations for a user. Such conventional recommendations can be based on incomplete or inaccurate information. For example, in some cases, conventional recommendations can be simplistically based on a fraction of the considerations that the user would find important in considering subject matter associated with the recommendations. When they fail to account for the priorities of a user receiving them, conventional recommendations can have little value and potentially mislead. As another example, conventional recommendations can be based on one or more opinions provided by others who are not similar to the user. Divergence among persons can be a telling indication that the value of recommendations provided among them may be suspect.

An improved approach implemented in computer technology overcomes these and other disadvantages associated with conventional approaches rooted in computer technology. Systems, methods, and computer readable media of the present technology can provide accurate recommendations. Such recommendations can include, for example, recommendations to any type of location, such as restaurants and other types of locations as discussed herein. In an attribute based technique, attributes can be determined for each type of location. With respect to a type of location, values for the attributes can be determined for each particular location. A user can be prompted to provide ratings for a plurality of locations. The plurality of locations can be chosen to cover a broad selection of attributes and a broad selection of attribute values. The ratings for the plurality of locations can provide a personalized model that reflects the importance to the user of each respective attribute and associated attribute value. The personalized model can identify locations that can be recommended to the user. The personalized model can be retrained based on more ratings additionally provided by the user. In a collaborative filtering based technique, a model can be trained based on ratings of a plurality of other users on a plurality of locations associated with a type of location. In connection with the personalized model, the ratings of the user and the plurality of other users for a first establishment can be analyzed to predict a rating for a user for a second establishment. With respect to the first establishment, other users from the plurality of other users having ratings within a threshold distance of the rating the user can be selected. The difference in ratings for the first establishment between the user and each respective user of the selected other users associated with the satisfaction of the threshold can be determined to generate a difference value. A weighting factor can be applied to each difference value to generate a weighted difference value constituting an interval range. The interval ranges for each pairwise difference value between the user and each respective selected other user can be combined to generate a confidence interval. The ratings of the selected other users can be combined (e.g., averaged) to generate an expected rating. The confidence interval can be applied as a neighborhood around the expected rating to generate an expected rating interval for the user for the second establishment. The model can be continuously trained with additional ratings from the user and from the other users in connection with other locations. The personalized model can be viewed as having reached an accuracy threshold when an actual rating provided by the user falls within the expected rating interval. More details regarding the present technology are described herein.

FIG. 1 illustrates an example system 100 including an example location recommendation module 102 configured to provide recommendations regarding locations for a user, according to an embodiment of the present technology. The location recommendation module 102 can provide recommendations in relation to a variety of location types. Location types can include, for example, restaurants, stores, schools, bars, companies (e.g., employers), congregations, destinations, and any other categories of locations. In general, location types can include any locations that people may visit based on various considerations. While a restaurant may be exemplarily discussed in certain contexts for ease of explanation herein, any location type can be applicable in accordance with the present technology. The location recommendation module 102 can include a ratings collection module 104, a data processing module 106, and a recommendation provision module 112. The data processing module 106 can include an attribute module 108 and a collaborative filtering module 110. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the location recommendation module 102 can be implemented in any suitable combinations.

The ratings collection module 104 can prompt a user and other users to provide ratings for locations of a location type. In various embodiments, the other users can be connections of the user or members of a social networking system without a direct connection to the user. The ratings collection module 104 can present a user interface through which the user and the other users are prompted to provide ratings for the locations. The user interface can be presented on a display of a client computing device associated with the user and the other users. For example, the user interface can present to the user an identification of a location and request that the user provide a rating for the location. The rating can be a score or other quantitative indication of satisfaction. In one example, the score can be a value from a permissible range of values (e.g., a numerical range between zero and five; a selection from options of "excellent", "average", "poor"; etc.).

The ratings collection module 104 can select locations for presentation to and rating by the user based on a variety of considerations. The ratings collection module 104 can select such a location based on satisfaction of a threshold likelihood that the user will have an opinion on the location to warrant the provision of a rating. In this regard, in one example, a location where a user has checked in using a location determination service provided by, for example, a client computing device associated with the user or a location within a threshold distance from where the user has checked in can be selected for presentation to the user. As another example, a location within a threshold distance from a residence of the user can be selected. As yet another example, a location within a threshold distance from a place of work of the user can be selected. When ratings for selected locations are provided by the user, the ratings collection module 104 can receive the ratings.

The data processing module 106 can process ratings of locations and can determine probabilities that a user will select a particular location. The attribute module 108 of the data processing module 106 can perform an attribute based technique to determine recommendations based on ratings by a user for various locations as well as attributes and attribute values determined for the locations. The attribute module 108 is discussed in more detail herein. The collaborative filtering module 110 of the data processing module 106 can perform a collaborative filtering technique to determine recommendations based on ratings by the user and other users. Ratings of the user and the other users for a first location and ratings of the other users for a second location can be used to predict a rating for the user for the second location. The collaborative filtering module 110 is discussed in more detail herein. In some embodiments, the attribute based technique and the collaborative filtering technique as discussed herein can be combined to determine recommendations for the user.

The recommendation provision module 112 can receive determinations of candidate locations and their associated probabilities of being desired by a user from the data processing module 106 and select locations to recommend to a user. The recommendation provision module 112 can apply a threshold recommendation value to determine recommendations. In some embodiments, the threshold recommendation value can be applied to candidate locations associated with probabilities that the user will find the locations to be satisfactory. In particular, the threshold recommendation value can be a selected percentage or probability. If a candidate location is associated with a probability that satisfies the threshold recommendation value, the candidate location can be provided to the user as a recommendation.

The recommendation provision module 112 can provide recommendations to a user based on a pull (e.g., a request by a user) or a push (e.g., a trigger detected by the location recommendation module 102 or a prompt from an administrator of the location recommendation module 102). In some embodiments, a user may request recommendations through a search request provided by a user. The search request can take any form, such as a keyword search or a structured search. In response to the search request, the recommendation provision module 112 can provide the recommendations as personalized search results to the user through an appropriate user interface. The user interface can be presented on a display of a client computing device associated with the user. In some embodiments, recommendations can be provided by the recommendation provision module 112 without prompting by the user. For example, if the recommendation provision module 112 determines that the user is within a threshold distance from a candidate location, the recommendation provision module 112 can automatically provide a recommendation regarding the candidate location to the user.

The recommendation provision module 112 can account for contextual data to select recommendations for locations that are consistent with the contextual data. In some embodiments, if a user performs a search for locations at a certain present place, the recommendation provision module 112 can select a portion of candidate locations that are within a threshold distance from the place. The selected portion of the candidate locations can be presented to the user. An unselected portion of candidate locations that are not within the threshold distance are not presented to the user. In some embodiments, the recommendation provision module 112 can account for a status of the user in relation to other participants or patrons of a candidate location. For example, the location recommendation module 102 can receive information that a user is a threshold distance from her residence, place of work, and other places that the user frequents and accordingly can determine that a current status of the user relates to the user being a tourist. If the user is a tourist at a present place and a portion of the candidate locations to be recommended to the user are popular with locals (but not tourists), then the recommendation provision module 112, for example, can filter out the candidate locations popular with locals or ask the user if the user would like to receive candidate locations that are popular with locals. In some embodiments, if a user performs a search for locations at a certain time, the recommendation provision module 112 can select a portion of candidate locations that are relevant for the time. For example, if a user performs a search for restaurants at 7:35 am, the recommendation provision module 112 can provide restaurants that serve breakfast. Many other variations are possible based on these and other contextual data.

In some embodiments, the location recommendation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the location recommendation module 102 can be, in part or in whole, implemented as software running on one or more computing devices or systems, such as on a server or a client computing device. For example, the location recommendation module 102 can be, in part or in whole, implemented within or configured to operate in conjunction or be integrated with a social networking system (or service), such as a social networking system 630 of FIG. 6. As another example, the location recommendation module 102 can be implemented as or within a dedicated application (e.g., app), a program, or an applet running on a user computing device or client computing system. In some instances, the location recommendation module 102 can be, in part or in whole, implemented within or configured to operate in conjunction or be integrated with client computing device, such as a user device 610 of FIG. 6. It should be understood that many variations are possible.

A data store 118 can be configured to store and maintain various types of data, such as the data relating to support of and operation of the location recommendation module 102. The data can include data relating to, for example, location types, locations, ratings for locations by users, attributes associated with a location type, attribute values associated with locations, personalized models based on attribute based techniques, personalized models based on collaborative filtering techniques, etc. The data store 118 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the location recommendation module 102 can be configured to communicate and/or operate with the data store 118.

Figure 2:
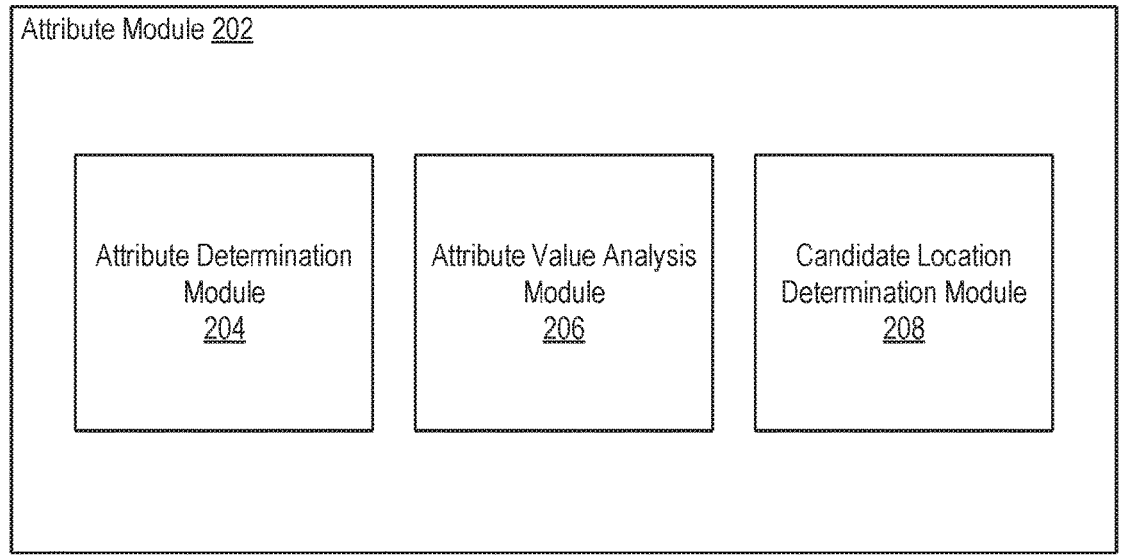
FIG. 2 illustrates an example attribute module, according to an embodiment of the present technology.

FIG. 2 illustrates an example attribute module 202, according to an embodiment of the present technology. In some embodiments, the attribute module 108 of FIG. 1 can be implemented with the attribute module 202. The attribute module 202 can perform an attribute based technique to determine candidate locations for a user. The attribute module 202 can include an attribute determination module 204, an attribute value analysis module 206, and a candidate location determination module 208.

The attribute determination module 204 can determine attributes for a location type. Each location type may be associated with a unique set of attributes. The attributes associated with a location type and values of the attributes can be factors that inform a satisfaction level or an interest level of a person with respect to a location. In one example, when the location type is restaurants, the attributes can include, for example, one or more of price, hours, atmosphere, mood, good for groups, good for kids, good for dates, popular with locals, popular with tourists, rowdy, quiet, etc. Other location types can be associated with other attributes.

Each location can be associated with attribute values for the attributes. Attribute values can be measured or reflected by a score or other quantitative indication. The score can be a value from a permissible range of values (e.g., a range between zero and ten; a selection from options of "excellent", "average", "poor", etc.). Other quantitative indication can include, for example, a price value (e.g., three dollar signs) determined from a maximum number of dollar signs (e.g., four dollar signs) designating a highest price; an atmosphere value (e.g., two and a half candles) determined from a maximum number of candles (e.g., four candles) designating a best atmosphere; a noise value (e.g., two bells) determined from a maximum number of bells (e.g., three bells) designating loudest noise; etc.

The attributes values for a location can be provided by the location, users, and a platform in which the location recommendation module 102 may be implemented, such as a social networking system. In some embodiments, with respect to a particular location of a certain location type, a computer system associated with the location can provide one or more attribute values to the attribute determination module 204. In the example of a location type relating to restaurants, and with respect to a particular restaurant, the attribute value relating to, for example, price (e.g., four dollar signs) can be provided by the restaurant itself to the attribute determination module 204 via a communications interface through which a computer system associated with the restaurant and the attribute determination module 204 can communicate. In some embodiments, with respect to a particular location, users who have visited the location can provide values relating to an attribute and the values can be aggregated (e.g., averaged) to constitute an attribute value. In the example of a location type relating to restaurants, and with respect to a particular restaurant, users who have visited the location can provide individualized values reflecting their opinions relating to, for example, a level of atmosphere for the location. The individual values can be aggregated to constitute an attribute value relating to atmosphere (e.g., two and a half candles). In some embodiments, with respect to a particular location, the social networking system can analyze data associated with the location to determine one or more attribute values. In the example of a location type relating to restaurants, and with respect to a particular restaurant, the social networking system implementing the attribute determination module 204 can analyze one or more media content items (e.g., audio and video of the restaurant) associated with the location to determine an attribute value relating to, for example, noise (e.g., one bell), good for groups (e.g., eight out of ten points), good for dates (e.g., one out of five points), etc. Analysis of the media content items can be performed by an suitable image detection or image recognition techniques. User data, such as data regarding types of connections between users, can be maintained and used by the social networking system to determine the attribute values. For example, subject to applicable privacy settings and user preferences, the attribute determination module 204 can perform facial recognition or detection on images to determine that a restaurant consistently receives parties of two persons who are in a relationship with one another. In this example, the attribute determination module 204 can determine that the restaurant is good for dates. Many variations are possible.

The attribute determination module 204 can receive ratings for locations by a user from the ratings collection module 104. As discussed, the locations are selected to reflect a broad array of locations and a broad array of attribute values for the locations. The ratings for the selected locations provided by the user can be used to generate a personalized model tailored for the user to identify locations likely to be desired by the user based on attribute values correlated with the locations that the user has rated highly.

The attribute value analysis module 206 can build a personalized model reflecting attribute values indicative of a location desired by a user. In general, when a location is given a high rating by the user, the attribute values of the location can be indicative of a location desired by the user. Likewise, when a location is given a low rating by the user, the attribute values of the location can be indicative of a location that is not desired by the user. The attribute value analysis module 206 can analyze and correlate the ratings for a plurality of locations with attribute values on an attribute value-by-attribute value basis to determine the importance level of each attribute value in identifying a location desired by the user. The personalized model can be developed based on analysis and identification of the attribute values that have been determined to be most important to and desired by the user.

As just one example, assume that a user assigns a five star rating (e.g., a highest possible rating) to a first restaurant having an attribute value relating to price that is equal to five dollar signs, an attribute value relating to atmosphere that is equal to one candle, and an attribute value relating to noise that is equal to one bell. Assume further that the user assigns a five star rating (e.g., a highest possible rating) to a second restaurant having an attribute value relating to price that is equal to five dollar signs, an attribute value relating to atmosphere that is equal to one candle, and an attribute value relating to noise that is equal to three bells. Based on the rating for the first restaurant and the rating for the second restaurant and a correlation with the attribute values associated with the restaurants, the attribute value analysis module 206 can determine that an attribute value relating to price of five dollar signs and an attribute value relating to atmosphere of one candle can be important to and desired by the user, and that the attribute value relating to noise can be unimportant to the user. Assume further that the user assigns a one star rating (e.g., a lowest possible rating) to a third restaurant having an attribute value relating to price that is equal to five dollar signs, an attribute value relating to atmosphere that is equal to one candle, an attribute value relating to noise that is equal to one bell, and an attribute value relating to whether the restaurant is good for groups that is equal to "poor". Based on the rating for the first restaurant, the rating for the second restaurant, and the rating for the third restaurant and a correlation with the attribute values associated with the restaurants, the attribute value analysis module 206 can further determine that an attribute value relating to whether the location is good for groups that is equal to "poor" can be important to the user and, more particularly, that an attribute value relating to whether the location is good for groups that is equal to "excellent" can be important to and desired by the user. More ratings for locations by the user and attribute values associated with the locations can be similarly analyzed and correlated in this manner by the attribute value analysis module 206 so that the model can learn more about the preferences of the user relating to attributes and associated attribute values.

The preferences of the user can be reflected in the model as weights associated with attributes and attribute values. In some embodiments, a weight associated with each attribute can reflect the importance of the attribute to the user. The distribution of weights over various attributes can reflect the relative importance of the attributes from the perspective of the user. Likewise, in some embodiments, a weight associated with each attribute value associated with an attribute can reflect the importance of the attribute value to the user. The distribution of weights over various attribute values associated with an attribute can reflect the relative importance of the attribute values from the perspective of the user. In some embodiments, the weights of all of the attributes and the weights of all of the attributes values associated with an attribute can sum to and be limited by a respective predetermined attribute weight total and a predetermined attribute value weight total. The distribution of weights for attributes and attribute values can change as the model develops to learn more about the preferences of the user. While the foregoing explanation is provided as an illustration, many variations are possible.

The candidate location determination module 208 can determine probabilities that a user will desire a candidate location. The determination of such probability for a location can be based on the model developed by the attribute value analysis module 206. For each location, the attributes and attribute values for the location can be analyzed by the model. In some embodiments, high correlation or agreement between the attributes and the attributes values of a candidate location and the attributes and the attributes values determined by the model to be desired by the user can be indicative of a higher probability. Likewise, low correlation or disagreement between the attributes and attributes values of a candidate location and the attributes and attributes values determined by the model to be desired by the user can be indicative of a lower probability. In this manner, the candidate location determination module 208 can determine a probability that the location will be desired by the user for each candidate location. The probability associated with each candidate location can be further processed by the recommendation provision module 112, as discussed herein.

Figure 3:
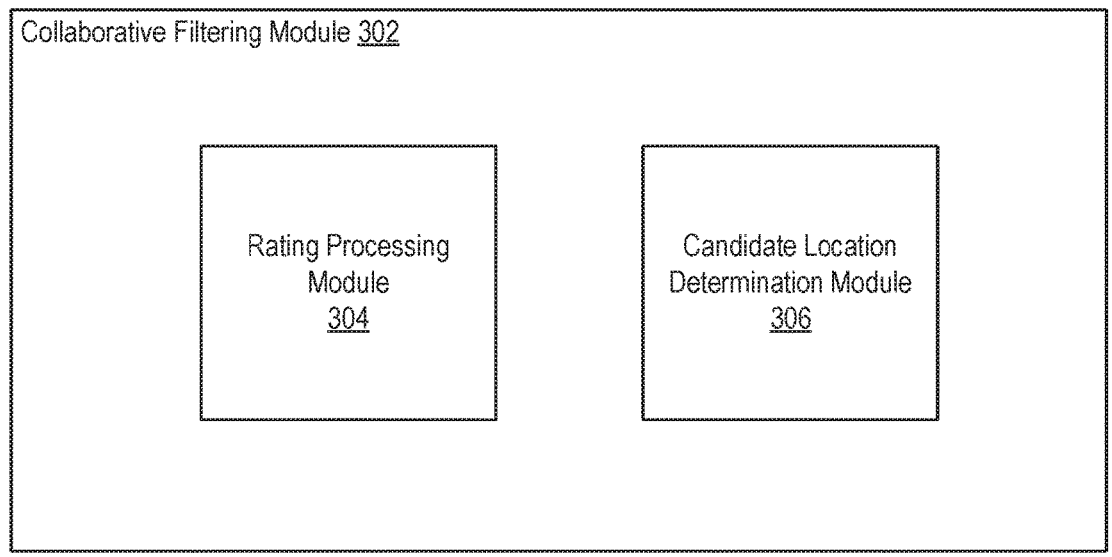
FIG. 3 illustrates an example collaborative filtering module, according to an embodiment of the present technology.

FIG. 3 illustrates an example collaborative filtering module 302, according to an embodiment of the present technology. In some embodiments, the collaborative filtering module 110 of FIG. 1 can be implemented with the collaborative filtering module 302. The collaborative filtering module 302 can perform a collaborative filtering technique to determine candidate locations for a user. The collaborative filtering module 302 can include a rating processing module 304 and a candidate location determination module 306.

The rating processing module 304 can create a model to predict a rating for a location for a user based at least in part on similarity between the user and other users with respect to ratings for one or more other locations. As just one example, the rating processing module 304 can receive a rating for a first location (or a plurality of locations) by a user and ratings for the first location (or the plurality of locations) by other users. The other users can be a community within a social networking system, such as all or some of the connections of the user or a larger number of members on the social networking system. In some embodiments, the rating processing module 304 can select a portion of the other users who are within a threshold distance from the user based on their ratings for the first location. Any suitable threshold distance can be used. In some embodiments, a nearest neighbor algorithm can be applied to select the portion of the other users.

Continuing with the example, the rating processing module 304 can calculate, for the first location, a difference between the rating of the user and the rating of each respective selected other user to generate a pairwise difference value. A weighting function can be applied to each difference value to generate a weighted difference value. In one example, the weights applied by the weighting function can vary (e.g., exponential decay) according to rating similarity so that ratings that are close result in a relatively large weight applied to an associated difference value and ratings that are not close result in a relatively small weight applied to an associated difference value. The weighted difference values for the pairwise calculations between the rating by the user and the ratings by the respective selected others can be combined to generate a confidence interval.

Continuing with the example, the rating processing module 304 can use the confidence interval in connection with a prediction of a rating for a second location for the user. The rating processing module 304 can predict a rating for the second location for the user based on any of a variety of conventional techniques. As just one example, a rating for the second location for the user can be an average of the ratings for the second location provided by the selected other users to generate an expected rating for the second location for the user. The confidence interval can be applied to the expected rating to generate an expected rating interval that spans from a value of the expected rating minus one half of the confidential interval to the value of the expected rating plus one half of the confidence interval.

The rating processing module 304 can continuously develop the model based on additional ratings of the user and additional ratings of other users for various locations. When the user provides an actual (or observed) rating for a location for which an expected rating has been predicted by the model, and the provided actual rating does not fall within the confidence interval of the expected rating (or does not fall within another threshold distance from the expected rating), the model can continue to be developed to increase accuracy. The model can be developed using additional ratings for additional locations from the user and from the other users. When the model is developed to accurately predict expected ratings for the user, the rating processing module 304 can select candidate locations associated with expected ratings that satisfy a threshold recommendation value. In some embodiments, the threshold recommendation value can account for a confidence interval associated with the expected rating. In some embodiments, expected ratings associated with locations that satisfy the threshold recommendation value can be indicative of candidate locations that may be desired by the user. For example, if a rating is based on a rating scale of five possible stars, a threshold recommendation value can be three stars. In this example, any locations associated with ratings that satisfy (e.g., are equal to or greater than) the threshold recommendation value of three stars can be identified as candidate locations for recommendation to the user. Likewise, any locations associated with ratings that do not satisfy the threshold recommendation value of three stars can be discarded from further consideration. While the foregoing explanation is provided as an illustration, many variations are possible.

The candidate location determination module 306 can determine probabilities that a user will desire a candidate location. In some embodiments, the length of a confidence interval determined for an expected rating can be associated with a probability that the expected rating for the second location by the user is accurate and that the second location will be desired by the user. For example, a relatively small confidence interval, such as a confidence interval that satisfies (e.g., is equal to or is less than) a threshold range, can indicate that the expected rating is associated with a relatively high probability that the expected rating is accurate. Likewise, a relatively large confidence interval, such as a confidence interval that does not satisfy a threshold accuracy, can indicate that the expected rating reflects a relatively low probability that the rating is accurate. The candidate location determination module 306 can analyze confidence intervals associated with expected ratings for locations to determine the probability of accuracy of each expected rating. The probabilities can be further processed by the recommendation provision module 112, as discussed herein.

Figure 4:
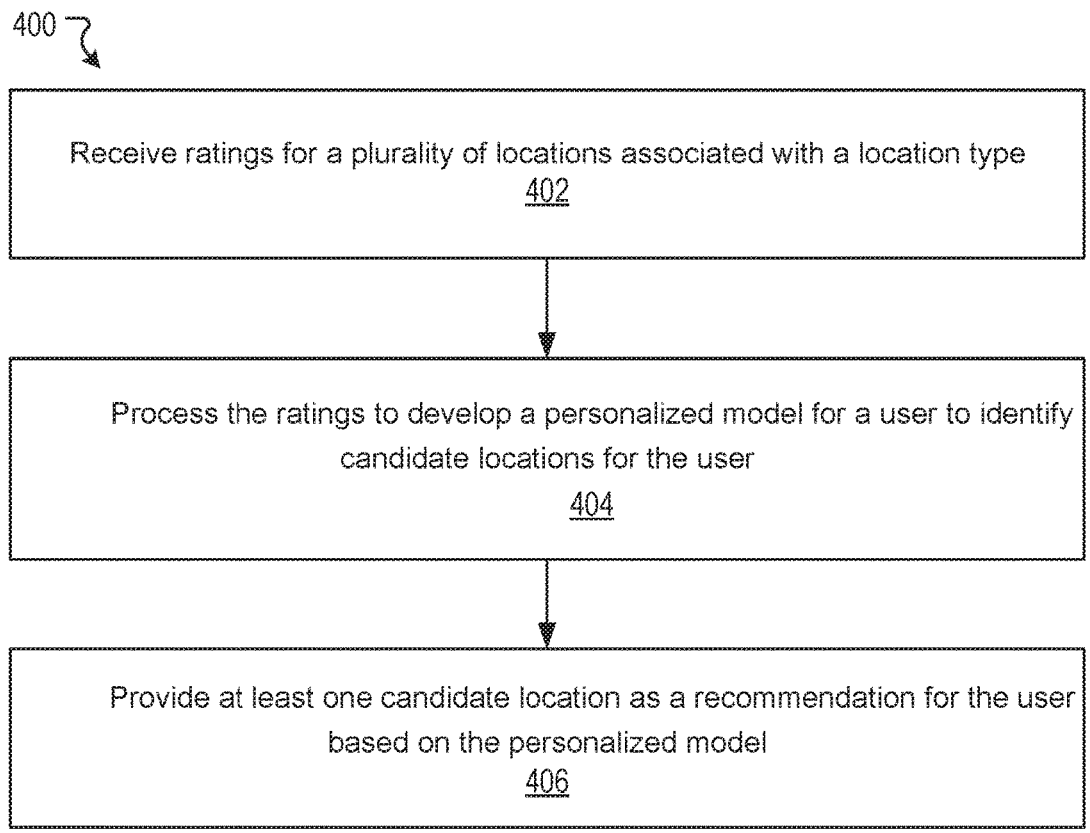
FIG. 4 illustrates a first method to recommend a location, according to an embodiment of the present technology.

FIG. 4 illustrates a first example method 400 to recommend locations, according to an embodiment of the present technology. It should be appreciated that there can be additional, fewer, or alternative steps performed in similar or alternative orders, or in parallel, in accordance with the various embodiments and features discussed herein unless otherwise stated.

At block 402, the method 400 can receive ratings for a plurality of locations associated with a location type. At block 404, the method 400 can process the ratings to develop a personalized model for a user to identify candidate locations for the user. At block 406, the method 400 can provide at least one candidate location as a recommendation for the user based on the personalized model. Other suitable techniques that incorporate various features and embodiments of the present technology are possible.

Figure 5A:
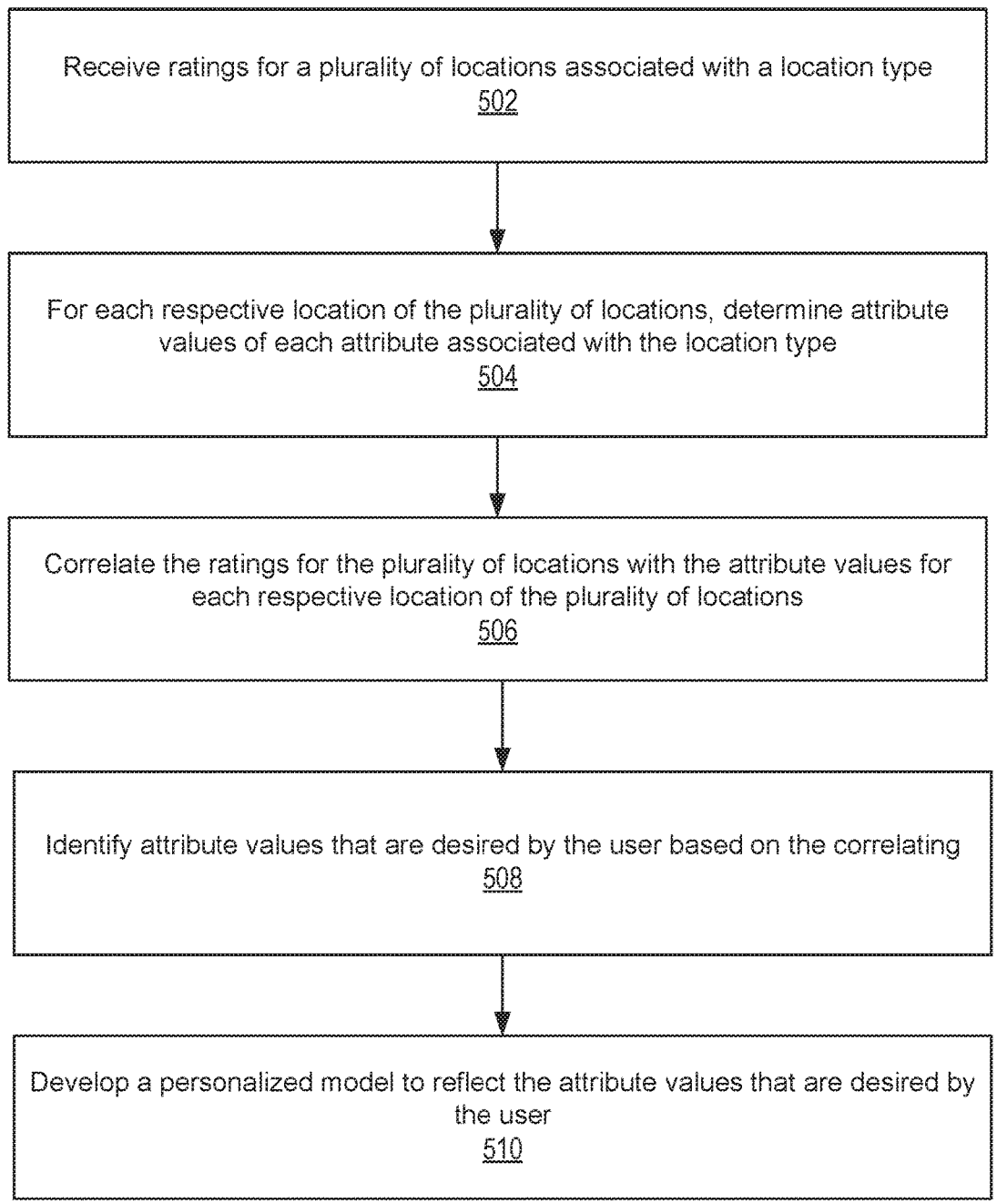
FIG. 5A illustrates a second method to recommend a location, according to an embodiment of the present technology.

FIG. 5A illustrates a second example method 500 to recommend locations, according to an embodiment of the present technology. It should be appreciated that there can be additional, fewer, or alternative steps performed in similar or alternative orders, or in parallel, in accordance with the various embodiments and features discussed herein unless otherwise stated.

At block 502, the method 500 can receive ratings for a plurality of locations associated with a location type. At block 504, the method 500 can, for each respective location of the plurality of locations, determine attribute values of each attribute associated with the location type. At block 506, the method 500 can correlate the ratings for the plurality of locations with the attribute values for each respective location of the plurality of locations. At block 508, the method 500 can identify attribute values that are desired by the user based on the correlating. At block 510, the method 500 can develop a personalized model to reflect the attribute values that are desired by the user. Other suitable techniques that incorporate various features and embodiments of the present technology are possible.

FIGS. 5B-5C illustrate a third example method 550 to recommend locations, according to an embodiment of the present technology. It should be appreciated that there can be additional, fewer, or alternative steps performed in similar or alternative orders, or in parallel, in accordance with the various embodiments and features discussed herein unless otherwise stated.

At block 552, the method 550 can calculate a pairwise difference between a rating for at least a first location from a user and each rating for at least the first location from each user in a set of other users to generate difference values. In some instances, the set of other users may be selected as being within a threshold distance from the user based on their scores. In some instances, each difference value can be weighted according to a weighting function. At block 554, the method 550 can combine the difference values to generate a confidence interval. At block 556, the method 550 can calculate an expected rating for a second location for the user based on ratings for the second location from the set of other users. At block 558, the method 550 can apply the confidence interval to the expected rating to generate an expected rating interval. At block 560, the method 550 can receive an actual rating for the second location from the user. At block 562, the method 550 can determine that the actual rating does not fall within the expected rating interval. At block 564, the method 550 can develop a personalized model based on additional ratings for additional locations from the user and the set of other users. Other suitable techniques that incorporate various features and embodiments of the present technology are possible.

Social Networking System—Example Implementation

Figure 6:
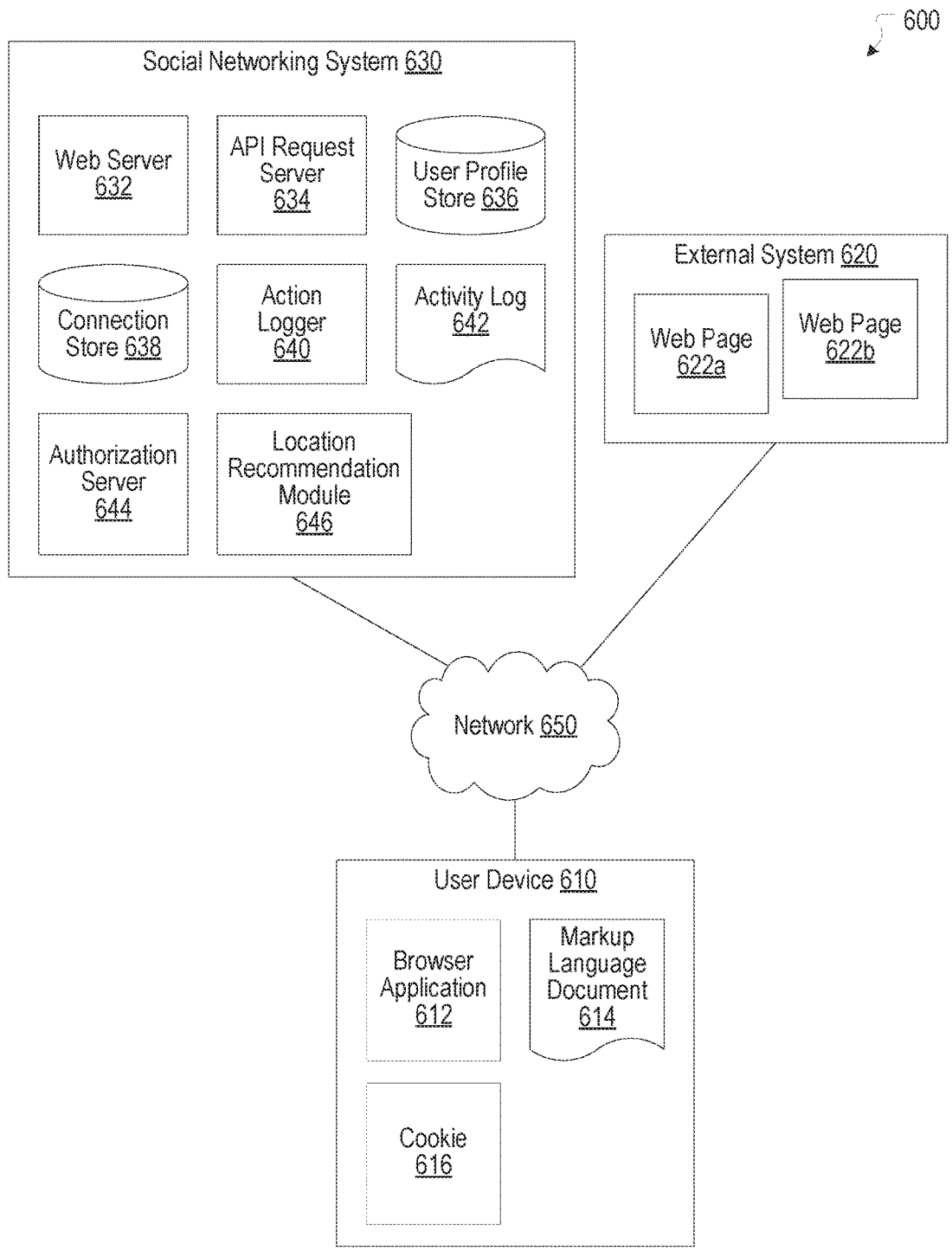
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 655. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 655. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 655. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 655, which may comprise any combination of local area and/or wide area networks, using wired and/or wireless communication systems.

In one embodiment, the network 655 uses standard communications technologies and protocols. Thus, the network 655 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 655 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 655 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 655. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 655.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 655. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 655, and the API request server 634 receives the API request. The API request server 634 processes the request by calling an API associated with the API request to generate an appropriate response, which the API request server 634 communicates to the external system 620 via the network 655. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a location recommendation module 646. The location recommendation module 646 can be implemented with the location recommendation module 102, as discussed in more detail herein. In some embodiments, one or more functionalities of the location recommendation module 646 can be implemented in the user device 610.

Hardware Implementation

Figure 7:
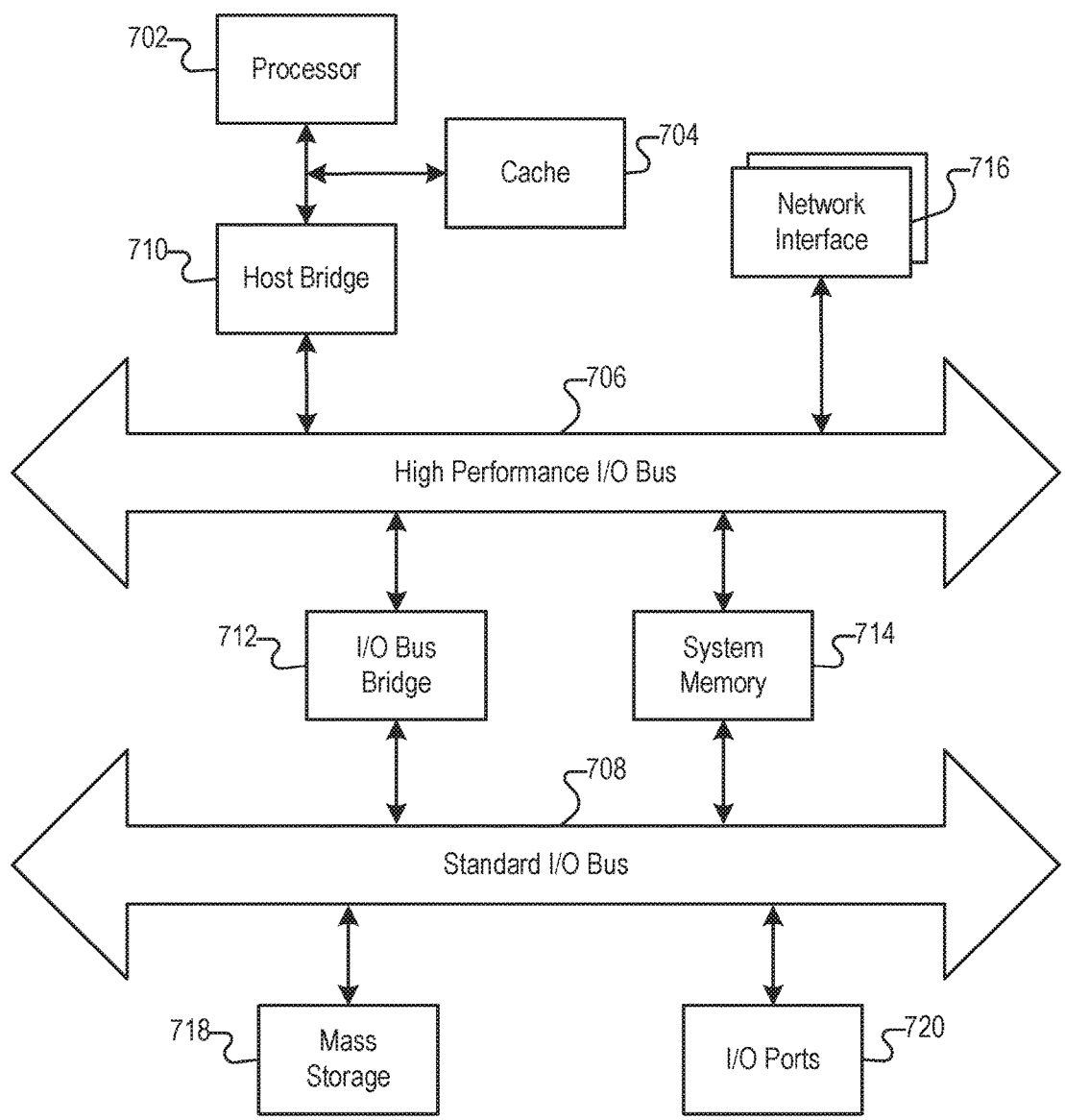
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:

receiving, by a computing system, ratings, provided by at least a user and a set of other users through a social networking system, for a plurality of locations associated with a location type, wherein receiving the ratings comprises:
  receiving a rating for at least a first location from the user and ratings for at least the first location from the set of other users; and
  receiving ratings for a second location from the set of other users;

developing, by the computing system, a personalized model for the user, based on attributes associated with the location type and the ratings for the plurality of locations wherein the developing comprises:
  calculating a pairwise difference between the rating for at least the first location from the user and each rating for at least the first location from each user in the set of other users to generate difference values, wherein the difference values are weighted by an exponential decay function based on a similarity between the rating from the user and each rating from each user in the set of other users;
  generating a confidence interval based at least in part on the weighted difference values;
  calculating an expected rating for the second location based on the ratings for the second location from the set of other users; and
  applying the confidence interval to the expected rating, wherein the confidence interval is associated with an accuracy of the expected rating;

providing, by the computing system, the second location as a recommendation for the user based on the personalized model based at least in part on whether the confidence interval satisfies a threshold accuracy;

determining, by the computing system, that an actual rating received from the user for the second location does not fall within the confidence interval; and developing, by the computing system, the personalized model further for the user based on the actual rating and the ratings for the second location from the set of other users.

2. The computer-implemented method of claim 1, wherein the location type relates to at least one of: restaurants, stores, schools, bars, companies, congregations, or destinations.

3. The computer-implemented method of claim 1, further comprising:
for each respective location of the plurality of locations, determining attribute values of each attribute associated with the location type.

4. The computer-implemented method of claim 3, wherein at least a portion of the attribute values are determined based at least in part on user data maintained by the social networking system.

5. The computer-implemented method of claim 3, wherein the developing the personalized model for the user further comprises:
correlating the ratings for the plurality of locations with the attribute values for each respective location of the plurality of locations;
identifying desired attribute values that are desired by the user based on the correlating; and
developing the personalized model to reflect the desired attribute values that are desired by the user.

6. The computer-implemented method of claim 5, wherein the developing the personalized model for the user further comprises:
assigning a weight to each attribute value to reflect an importance of each attribute to the user; and
developing the personalized model to reflect the assigned weight.

7. The computer-implemented method of claim 1, wherein generating the confidence interval comprises combining at least one of: the difference values or the weighted difference values.

8. The computer-implemented method of claim 1, wherein the developing the personalized model further for the user further comprises:
developing the personalized model further for the user based on additional ratings for additional locations from the user and the set of other users.

9. A system comprising:
at least one processor; and
a memory storing instructions that, when executed by the at least one processor, cause the system to perform:
receiving ratings, provided by at least a user and a set of other users through a social networking system, for a plurality of locations associated with a location type, wherein receiving the ratings comprises:
receiving a rating for at least a first location from the user and ratings for at least the first location from the set of other users; and
receiving ratings for a second location from the set of other users;
developing a personalized model for the user, based on attributes associated with the location type and the ratings for the plurality of locations, wherein the developing comprises:
calculating a pairwise difference between the rating for at least the first location from the user and each rating for at least the first location from each user in the set of other users to generate difference values, wherein the difference values are weighted by an exponential decay function based on a similarity between the rating from the user and each rating from each user in the set of other users;
generating a confidence interval based at least in part on the weighted difference values;
calculating an expected rating for the second location based on the ratings for the second location from the set of other users; and
applying the confidence interval to the expected rating, wherein the confidence interval is associated with an accuracy of the expected rating;
providing the second location as a recommendation for the user based on the personalized model based at least in part on whether the confidence interval satisfies a threshold accuracy;
determining that an actual rating received from the user for the second location does not fall within the confidence interval; and
developing the personalized model further for the user based on the actual rating and the ratings for the second location from the set of other users.

10. The system of claim 9, wherein the location type relates to at least one of: restaurants, stores, schools, bars, companies, congregations, or destinations.

11. The system of claim 9, wherein the instructions further cause the system to perform:
for each respective location of the plurality of locations, determining attribute values of each attribute associated with the location type.

12. The system of claim 11, wherein the developing the personalized model for the user further comprises:
correlating the ratings for the plurality of locations with the attribute values for each respective location of the plurality of locations;
identifying desired attribute values that are desired by the user based on the correlating; and
developing the personalized model to reflect the desired attribute values that are desired by the user.

13. The system of claim 12, wherein the developing the personalized model for the user further comprises:
assigning a weight to each attribute value to reflect an importance of each attribute to the user; and
developing the personalized model to reflect the assigned weight.

14. A non-transitory computer-readable storage medium including instructions that, when executed by at least one processor of a computing system, cause the computing system to perform a method comprising:
receiving ratings, provided by at least a user and a set of other users through a social networking system, for a plurality of locations associated with a location type, wherein receiving the ratings comprises:
receiving a rating for at least a first location from the user and ratings for at least the first location from the set of other users; and
receiving ratings for a second location from the set of other users;
developing a personalized model for the user, based on attributes associated with the location type and ratings for the plurality of locations, wherein the developing comprises:
calculating a pairwise difference between the rating for at least the first location from the user and each rating for at least the first location from each user in the set of other users to generate difference values, wherein the difference values are weighted by an exponential decay function based on a similarity between the rating from the user and each rating from each user in the set of other users;

generating a confidence interval based at least in part on the weighted difference values;

calculating an expected rating for the second location based on the ratings for the second location from the set of other users; and applying the confidence interval to the expected rating, wherein the confidence interval is associated with an accuracy of the expected rating;

providing the second location as a recommendation for the user based on the personalized model based at least in part on whether the confidence interval satisfies a threshold accuracy;

determining that an actual rating received from the user for the second location does not fall within the confidence interval; and developing the personalized model further for the user based on the actual rating and the ratings for the second location from the set of other users.

15. The non-transitory computer-readable storage medium of claim 14, wherein the location type relates to at least one of: restaurants, stores, schools, bars, companies, congregations, or destinations.

16. The non-transitory computer-readable storage medium of claim 14, wherein the method further comprises:

for each respective location of the plurality of locations, determining attribute values of each attribute associated with the location type.

17. The non-transitory computer-readable storage medium of claim 16, wherein the developing the personalized model for the user further comprises:

correlating the ratings for the plurality of locations with the attribute values for each respective location of the plurality of locations;

identifying desired attribute values that are desired by the user based on the correlating; and developing the personalized model to reflect the desired attribute values that are desired by the user.

18. The non-transitory computer-readable storage medium of claim 17, wherein the developing the personalized model for the user further comprises:

assigning a weight to each attribute value to reflect an importance of each attribute to the user; and developing the personalized model to reflect the assigned weight.

\* \* \* \* \*